United States Patent Office 3,592,939
Patented July 13, 1971

3,592,939
METHOD OF SEPARATING METAL VALUES
Raymond Derry, Stevenage, England, assignor to Brandhurst Company Limited and Charter Consolidated Limited, both of London, England
No Drawing. Filed Apr. 10, 1968, Ser. No. 720,404
Claims priority, application Great Britain, Apr. 11, 1967, 16,591/67
Int. Cl. C22b *17/04, 23/04, 15/12*
U.S. Cl. 75—108                                8 Claims

ABSTRACT OF THE DISCLOSURE

A process for separating metal values from a mixture which includes the step of hydrogenating a mixture of the metal hydroxides at an elevated temperature and pressure such that at least one of the hydroxides is reduced to metallic form while at least one is not reduced. The metal(s) may then be separated from the remaining hydroxide(s).

This invention relates to the separation of metal values.

It is well known that certain metal values can be precipitated from aqueous solution by treatment with hydrogen at elevated temperature and pressure. It is also known that a separation of metal values can be achieved by the use of the technique. In certain cases these separations are based on the fact that the more noble metal ions in the solution are thermodynamically reducible whereas under the same conditions less noble metal ions cannot be reduced, e.g. Cu/Zn separation. In other cases the separation of metal values is based on difference in the kinetics of the reduction of ions both of which are thermodynamically reducible, e.g. Ni/Co. It is also known that reduction of metal ions is thermodynamically favoured by an increase in the pH of the solution, consequently ammoniacal conditions are necessary with metals such as Ni or Co in order to precipitate metal powder from solutions of these metals.

The present invention provides a new and alternative approach to the problem of separating metal values in which the metals are precipitated in the form of their hydroxides and use is then made of differences in thermodynamic behaviour, as between the species involved, with reference to the reduction of the hydroxide to the metal by means of hydrogen with or without the aid of a catalyst.

According to the invention, a process for separating a metal of the group consisting of cadmium and metals more noble than cadmium from a metal which is less noble than cadmium comprises hydrogenating a mixture of the metal hydroxides at elevated temperature and pressure to achieve selective reduction to metallic form of metal values which are thermodynamically reducible from the hydroxide to the metal under the conditions of temperature and pressure employed.

The term "hydroxide" is used throughout this specification and the claims to include oxy-hydroxides and oxide hydrates in addition to the compounds identified as hydroxides in strict chemical nomenclature.

According to one particular aspect, this invention provides a process for separating nickel and chromium values which comprises hydrogenating a mixture of the metal hydroxides at elevated temperature and pressure to achieve selective reduction to metallic nickel.

In operating the process of this invention a solution containing the metals to be separated is treated with an alkali to obtain precipitated hydroxides. The alkali may be, for example, an alkali metal carbonate or hydroxide, or an alkaline earth metal carbonate, oxide or hydroxide. The preferred alkali is magnesia.

The precipitate of wet hydroxide is treated conveniently in the form of a slurry, and before or after separation from the original solution liquors, as desired.

The conditions of temperature and pressure used will depend on the particular mixture of metal values to be separated. Therefore no limits can be defined for the temperature and pressure to be used in the process. In general, variation in pressure affects the kinetics rather than the thermodynamics of the reaction, but a sufficiently high pressure should be chosen so that the reduction is not undesirably slow. A pressure of the order of 2000–3000 pounds per square inch may be required to achieve an acceptable process involving the reduction of cadmium. For metals less noble than cadmium it is not practical to attain the necessary pressure for reduction at a reasonable rate, and it is principally for this reason that cadmium has been designated as the metal at the lower limit of noble metals which can be reduced. On the other hand, it may be practical to reduce more noble metals such as platinum at a pressure of the order of 20 pounds per square inch. Nonetheless it is desirable to operate at a pressure in the range of 100–1000, particularly 200–600, pounds per square inch.

The temperature will vary accordingly to the metal values, having regard also to the reaction vessel and the fact that the hydrogenation is most conveniently carried out on a wet hydroxide slurry. Desirably the temperature will be in the range 150–350° C., particularly 150–250° C.

It will be appreciated that, in general, the more noble metals will require less rigorous conditions for reduction, whereas the less noble metals will require more rigorous conditions.

The process of the present invention has substantial advantages over the prior art process of precipitating metal values from aqueous solution by hydrogenation. The reduction process carried out in solution results in the production of acid, so that the pH of the solution tends to decrease; the reduction process carried out on hydroxide precipitates results in negligible change in pH. Thus the danger of acid corrosion of the reaction vessel is removed, and the choice of reaction vessel is simplified.

In some instances in the prior art, such as when nickel was to be precipitated from solution, it was necessary to use ammoniacal conditions. Thus sufficient ammonia had to be added to produce a soluble complex of the metal. In the present invention only the amount of alkali necessary to precipitate the hydroxides is used, and furthermore cheap alkalis can be used.

If the metal values were present in dilute solution, it was necessary to concentrate the solution to obtain a reasonable rate of precipitation of metal powder. However, in the present invention the reduction step is conveniently carried out on a slurry of hydroxide precipitates, in which the metal values have already been concentrated by the preliminary precipitation step.

The reduction may be carried out in an autoclave. If desired the autoclave may be glass lined and/or the reaction may be carried out under conditions such that contact between the slurry and metal surfaces is avoided. If metallic surfaces are present, some plastering on these surfaces will occur. Alternatively therefore, or in addition, an organic additive such as stearic acid may be added to the reaction mixture to prevent plastering onto the reaction vessel walls if these are metallic.

A catalyst may be present in the reaction vessel if required. The resulting metal powder may be separated from unreduced hydroxide by physical means such as gravity separation or magnetic separation in appropriate cases. Frequently, as a result of the conditions employed to effect the reduction, the unreacted precipitate is converted into a more granular form during the process so facilitating any filtration process which might be used subsequently.

The invention may be used to separate metals of Group A from those of Group B below:

Group A: Tc, Re, Co, Ni, Ru, Rh, Pd, Os, Ir, Pt, Cu, Ag, Hg, Tl, Pb, As, Sb, Bi, Se, Te, Po and Cd.
Group B: Be, Mg, Ca, Sr, Ba, Al, Sc, Y, Ti, Zr, Hf, V, Nb, Ta, Cr, Mo, W, Mn, Fe, Zn, Ga, In, Si, Ge, Sn, the lanthanides and the actinides.

The invention may be applied in processes for the winning of such metals from their ores and in certain other recovery processes in which mixtures of metal values occur, such as the recovery of constituents from metal alloy scrap.

The invention is illustrated by the following Examples:

EXAMPLE 1

A hot nickel-chromium chloride solution containing 50 g./l. nickel and 20 g./l. chromium is treated with sufficient magnesia (59 g. MgO per litre of the nickel-chromium solution) to precipitate all the nickel and chromium. The nature of the hydroxide precipitate formed is such that in attempts to filter the thick slurry considerable difficuly is encountered. The hydroxide slurry is transferred to an autoclave and treated with hydrogen gas at a partial pressure of 200–600 p.s.i. at a temperature of 200–220° C. The autoclave is glass-lined and the reaction is carried out under conditions such that contact between the slurry and the stainless steel autoclave walls or other metal surfaces is avoided. During the treatment the slurry is stirred at 1000 r.p.m. using a glass stirrer. Reduction of the hydroxide is complete within one hour. The autoclave is then cooled to room temperature and the granular nickel powder easily separated from the chromium hydroxide magnetically or using a laboratory superpanner. The residual chromium hydroxide settles readily and can be readily filtered; its settling properties are further improved by the addition of a flocculant. The nickel powder obtained using magnetic separation contains 99.5% Ni, 0.02% MgO, 0.23% Cl and 0.12% Cr and the yield is 96%. The chromium content of the powder is further reduced by rapidly washing in dilute 0.4% HCl. The acid washed nickel powder contains only 0.001% Cr and the overall yield is 93.3%.

EXAMPLE 2

As for Example 1 but with the reaction carried out in a stainless steel autoclave using a stainless steel stirrer but with an addition of 0.1% stearic acid to the charge in order to minimize plastering of nickel metal onto the metallic surfaces in the autoclave during the treatment. Similar yields and purities of nickel product are obtained.

EXAMPLE 3

A hot copper-zinc sulphate solution containing 50 g./l. Cu and 50 g./l. Zn is treated with sufficient magnesia to ensure complete precipitation of all the copper and all the zinc. The resultant slurry is reduced in an autoclave with hydrogen gas at a pressure of 450–600 p.s.i. and a temperature of 230° C., whilst stirring at a 1000 r.p.m. No seed catalysts are used. Reduction is complete in approximately 2 hours. The copper metal produced is separated from the residual zinc hydroxide using a laboratory superpanner. The copper powder assays at 75.5% Cu, 17.8% Zn. Treatment with 1% HCl at room temperature removes almost all of this residual Zn(OH)$_2$ with little dissolution of the Cu to give a copper powder which assays at 98.3% Cu.

EXAMPLE 4

A hot nickel zinc sulphate solution containing 50 g./l. Ni and 25 g./l. Zn is treated with sufficient magnesia to ensure complete precipitation of all nickel and all the zinc. The resultant slurry is reduced in an autoclave with hydrogen gas at a pressure of 450–600 p.s.i. at a temperature of 220–230° C. whilst stirring at 1000 r.p.m. No seed catalysts are added. Reduction is complete in approximately 2 hours. The nickel metal produced is separated from the residual zinc hydroxide magnetically. The nickel powder obtained assays at 92.5% Ni, 3.4% Zn. Treatment with 1% HCl at room temperature removes almost all of this residual Zn(OH)$_2$ with little dissolution of the Ni to give a nickel powder which assays at 99.7% Ni.

1. A process for separating a metal of the group consisting of cadmium and metals more noble than cadmium from a metal which is less noble than cadmium which comprises: forming an aqueous solution containing the metal values; adding to said solution an alkali chosen from alkali metal carbonates, alkali metal hydroxides, alkaline earth metal carbonates, alkaline earth metal oxides and alkaline earth metal hydroxides, whereby a mixture of metal hydroxides is precipitated to form an aqueous suspension, hydrogenating said precipitated mixture of metal hydroxides as an aqueous suspension at elevated temperature and pressure to achieve selective reduction to metallic form of those metal values which are thermodynamically reducible to the metal under the conditions of temperature and pressure employed; recovering said reducible metal values as metal; and recovering at least one metal value as hydroxide.

2. A process for separating nickel and chromium values according to claim 1 which compresses hydrogenating a mixture of the metal hydroxides at elevated temperature and pressure to achieve selective reduction to metallic nickel.

3. A process according to claim 1 wherein the alkali is magnesia.

4. A process according to claim 1 wherein the mixture of metal hydroxides is separated as a slurry from the solution liquors.

5. A process according to claim 1 wherein the metal which is thermodynamically reducible is nickel.

6. A process according to claim 1 wherein the metal which is thermodynamically reducible is copper.

7. A process according to claim 1 wherein the metal recovered as hydroxide is chromium.

8. A process according to claim 1 wherein the metal recovered as hydroxide is zinc.

References Cited

UNITED STATES PATENTS

| | | | |
|---|---|---|---|
| 827,717 | 8/1906 | Edison | 75—0.5 |
| 2,189,640 | 2/1940 | Powell | 75—0.5 |
| 2,254,976 | 9/1941 | Powell | 75—0.5 |
| 2,726,151 | 12/1955 | Kern | 75—0.5 |
| 2,836,485 | 5/1958 | Schaufelberger et al. | 75—119 |
| 2,853,374 | 9/1958 | Schaufelberger | 75—0.5 |

L. DEWAYNE RUTLEDGE, Primary Examiner

W. W. STALLARD, Assistant Examiner

U.S. Cl. X.R.

75—117, 119, 121